Patented Sept. 9, 1947

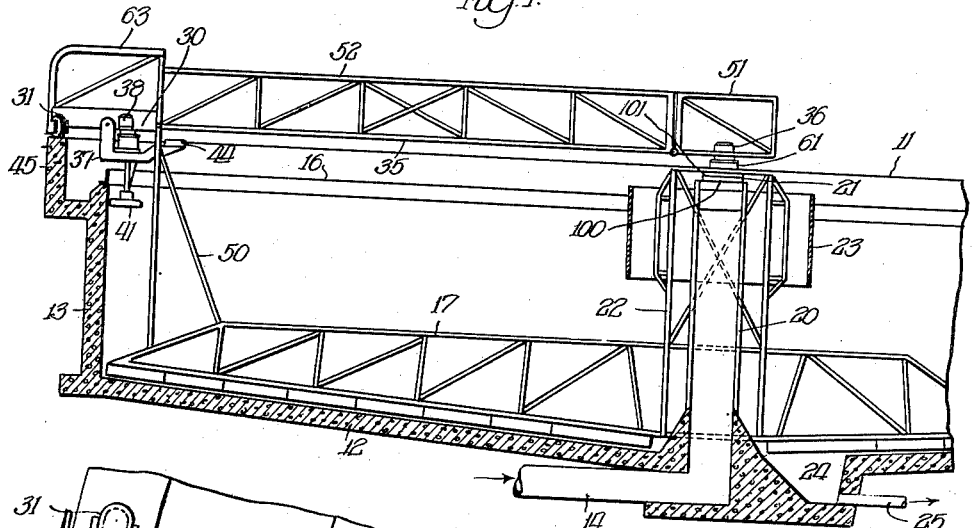
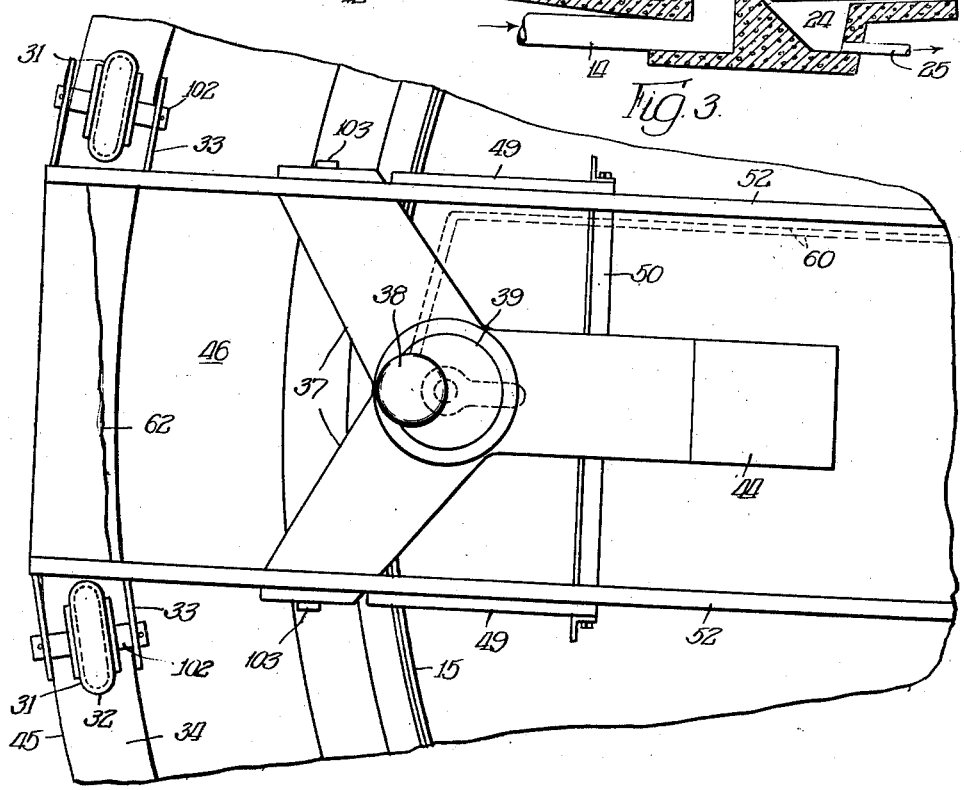

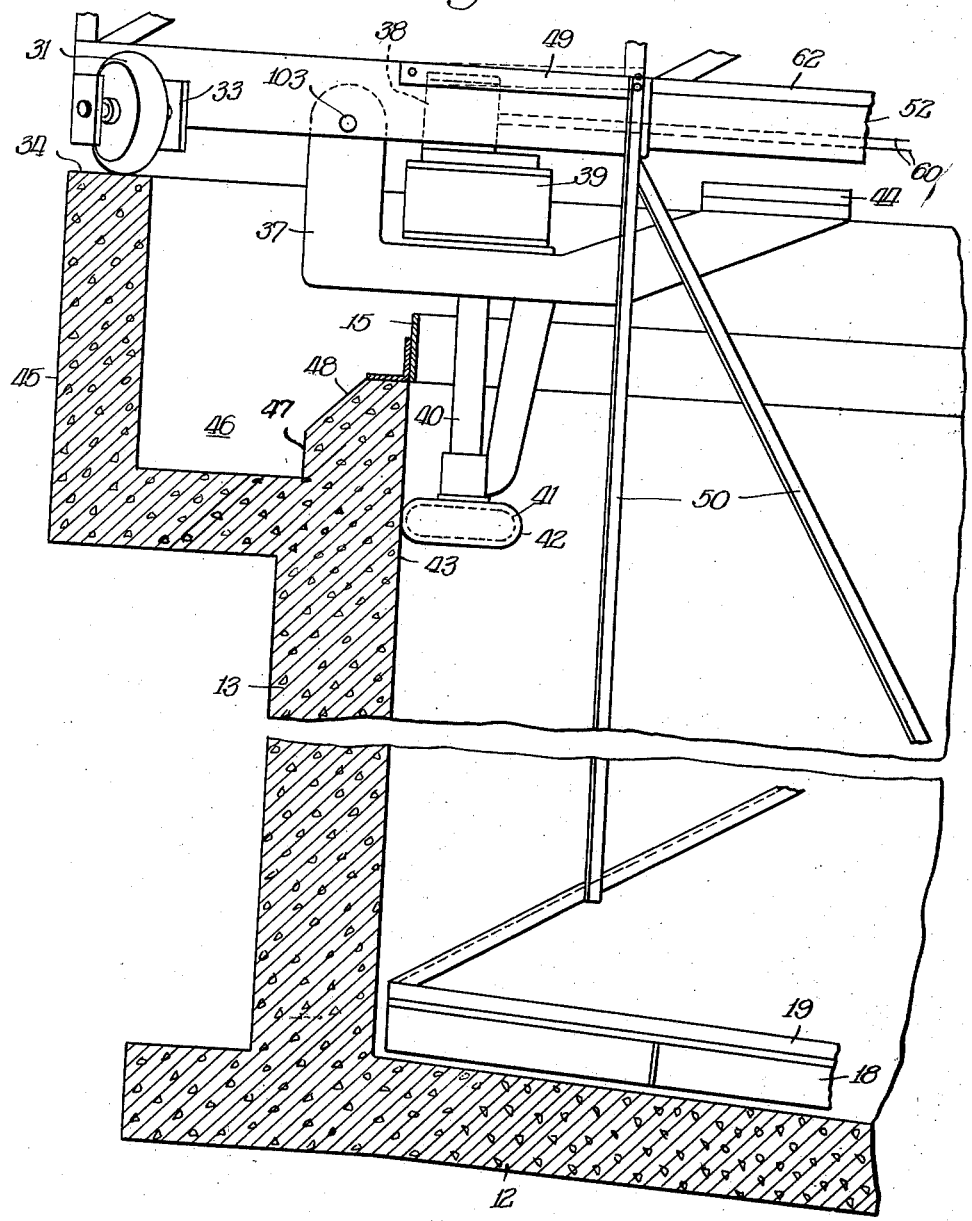

2,427,091

UNITED STATES PATENT OFFICE 2,427,091

LIQUID TREATMENT TANK WITH A SOLIDS IMPELLER MEANS HAVING A NORMALLY SUBMERGED DRIVE WHEEL

Augustus C. Durdin, III, Rockford, Ill., assignor to Graver Tank & Mfg. Co., Inc., a corporation of Delaware Application October 25, 1943, Serial No. 507,631

5 Claims. (Cl. 210—55)

This invention relates to liquid treatment by clarification, and particularly to the impelling of solids in a clarification tank.

It is an object of my invention to provide simple and efficient means and smooth operation, for the impelling of precipitated solids, such as settled sludge.

Another object is to eliminate major defects of solids impellers heretofore known and used, such as the "whipping" of center-driven solids impellers, the harmful effects of sleet and ice on earlier traction-driven solids impellers, and the various troubles experienced with chain-and-sprocket drives for conveyor flights due to the catching of solids on sprockets, abrasion of submerged bearings, and the like.

Another object is to absorb all starting loads and overloads of a solids impeller with simpler, more efficient, and less expensive means than heretofore used.

A specific object is to keep all or most of the bearings and lubricated parts of a solids impeller above the liquid level in the clarification tank, but at the same time to keep the drive wheel of the solids impeller slightly submerged below the liquid level to eliminate the adverse effects of the weather.

Another specific object and advantage is to use a vertical-shaft drive motor on a solids impeller and to yieldably establish horizontal contact and pressure between the drive wheel and a vertical drive surface in the clarification tank to eliminate troubles and high expense inherent in other drives.

Still another specific object is to maintain proper and adjustable contact, pressure and traction effort between a solids collector drive wheel and the drive surface thereof by supporting the drive wheel, the drive, and adjustable loading means such as weights from pivots located above the drive surface.

Additional objects are, in a traction drive for a solids impeller, to do away with the need for a metallic track, for accurately concentric relation of drive surface and center of rotation (if any), and for precision machinery or expensive devices such as pinion-and-rack engagements, chains with travelers and take-up means, or the like.

Finally it may be mentioned among the objects and advantages hereof that I make available for drives on solids impellers in clarification tanks, certain features heretofore used in other automotive drives, and which reside mainly in the principles of contacting a hard stationary driveway with a resilient drive wheel, enabling the tire of the drive wheel to seek its own path over the driveway, and providing suitable tread characteristics and engagement of the drive surface, and the resilient tire of the drive wheel, for slow, rolling engagement.

The invention will be described in connection with an illustrative embodiment, wherein the clarification tank is a round settler for radial, outward liquid flow and central removal of settled sludge, and wherein the solids impeller is a slowly rotatable sludge raking system of the type comprising a series of rake elements which gently agitate and dewater the settled sludge while collecting and removing the same. It will be appreciated that clarification tanks in general, and settlers in particular, may differ from this embodiment while using the gist of this invention; and this also applies to the impellers, their speed, the medium that they work upon, and various other features.

In the drawing, Figure 1 shows the said embodiment in central sectional elevation. Figure 2 is an enlarged side elevation of a detail, showing essential parts of the drive mechanism. Figure 3 is a plan view of the parts shown in Figure 2.

The settling tank 11 has a substantially circular concrete bottom wall 12, and a cylindrical, upstanding, peripheral, concrete side wall 13. It receives turbid influent liquid through the inlet pipe 14, while it discharges clarified effluent liquid over the weir 15, which also determines the liquid level 16. The settled sludge accumulating on the bottom 12 is collected by the rotatable sludge scraper system 17, comprising a series of rake elements or scraper blades 18 on the underside of scraper arms or trusses 19. Two arms are shown, both of which extend radially across the tank bottom, while the individual scraper blades extend at an angle to the radial arm carrying the same. The scraper system is centrally and rotatably supported above the liquid level 16, by means of a vertical, upstanding pier structure 20 resting on the bottom 12 in the center of the tank and extending above the liquid level 16, a turntable bearing 21 having a stationary part 100 installed on the top of the pier, and a rotatable part 101, and a structural cage structure 22 which has the rotatable part of the bearing installed in its top, and which depends therefrom; the scraper arms being rigidly held and rotated by said depending cage structure. The inlet pipe 14 preferably has its end extending vertically in the center of the pier 20; there being an inlet stilling well or diffuser drum 23 surrounding the opening of said end, through which the turbid influent liquid enters the tank. The sludge sump 24, which receives the sludge collected by the scraper system, may be located at the side of the pier 20, adjacent the center of the tank; it is emptied of sludge through a pipe 25.

The scraper system is propelled by a drive mechanism generally indicated at 30, which travels along a top part of the wall 13. In this mechanism I provide two supporting wheels 31 having resilient tires 32 and having their axles 102 suitably journalled in the support frame 33 which holds the said wheels in line with one another peripherally of the tank; the wheels and frame forming a support carriage 31, 33. Said carriage in turn is held upright, on the concrete top surface 34 of the wall 13, at a certain distance from the center of the top of the tank, by a radially rigid truss, frame or arm 35 which is pivoted on a central thrust bearing 36 supported by the pier 20. This arm 35 is rigidly secured to the frame 33.

A second frame 37 is pivoted to the frame 33 or 35 by journals 103, allowing the second frame to swing in a vertical plane. This second frame supports the vertical drive motor 38, gear reducer 39, output shaft 40 and drive wheel 41. The tire 42 of the drive wheel contacts a vertical, cylindrical driveway 43 in a direction normal to the driveway and wheel. This driveway forms part of the inside of the wall 13, a few inches below the liquid level 16, and is generally composed of the same concrete mixture which is used in building the rest of this wall. In some cases, however, the driveway may be specially surfaced by concrete grout or the like. Driving pressure is maintained between the tire 42 and the surface of the driveway 43 by the weight of the swingable frame 37 and the parts mounted thereon. The axis of the journals 103 of this swingable frame 37 extends horizontally, and substantially tangentially of the vertical, cylindrical plane of the driveway 43, above the line of contact between the tire and the driveway. The swingable frame 37 cantilevers radially and inwardly of the tank, and the motor-reducer 38—39 is so installed on this swingable frame that the output shaft 40 is substantially vertical when the two frames 33 and 37 are properly positioned with respect to the tank center and drive surface, and the tire 42 engages the drive surface. For simple adjustment of the drive pressure, a proper counter-weight or load means 44 may be mounted on the swingable frame 37, at a distance from the journals 103, radially of the tank.

The supporting wheels 31 travel on the substantially horizontal, annular, upper, concrete surface 34 of an outer and upper part 45 of the tank wall 13; an effluent launder 46 being formed between this outer part 45 and the overflow weir 15, and the weir being installed on the substantially horizontal top 48 of an inner part 47 of the tank wall 13. It will be understood that all of the annular concrete surface 34 can never be made geometrically horizontal, and that at least some tolerance such as plus or minus an eighth of an inch must be allowed. This is a very small tolerance for concrete work, as involved in the construction of the tank, but a very great one for intermeshing drive gear elements. Furthermore the support surface 34 as originally constructed is subject to wear and tear and also to the influence of rain, snow, sleet, ice and so on. As a result there may be a tendency for the drive mechanism irregularly to rise and to fall at least fractional inches as it travels around the tank. In case of serious sleet formation or the like, this mechanism may tend to rise and fall as much as an inch, or even more. In order to compensate for such irregular rising and falling tendencies, I provide a vertically flexible connection between the drive mechanism and the scraper system. Accordingly, the drive carriage 31, 33 propels the scraper system through the medium of links 49 which are pivoted to the frame 33 above the outer end of one of the arms 19, so as to be swingable in a vertical plane, and which are similarly pivoted to the upper end of a third frame or truss 50, said truss 50 being rigidly secured to and extending upwardly from the outer end of the arm 19; and similarly, the radially rigid truss 35 which guides the drive mechanism around the bearing 21 is composed of an inner rigid portion 51 and an outer rigid portion 52, said portions being pivoted together so as to allow the outer one to swing in a vertical plane, substantially radially of the tank. Thus the drive mechanism 30 can freely follow any rising or falling tendencies of the support carriage 31, 33, within considerable limits; the drive wheel 41 being able to seek a suitable path regardless of such rising or falling. Without such protection, undue overloads are frequently incurred; a traction mechanism may jam and stop indefinitely, and shearpins, shafts or the like may be broken.

The drive wheel 41, as mentioned, travels on the inside, concrete driveway 43. The surface of this driveway is substantially cylindrical, and vertical, and the bearing 21 is substantially concentric therewith, again subject to some minimum tolerances such as plus or minus an eighth of an inch, due to which the distances between the true center of the drive surface and the actual tank center may differ as much as a half inch, or even more, at various points of the drive surface. Such irregularities may again be increased by wear and tear, by thermal expansion or contraction of the truss 52, and the like. The irregularities would be reduced but not entirely eliminated if the drive mechanism 30 and thrust arm 35 were used to complete the grouting-in of the driveway 43. As a result of remaining irregularities, the contact and pressure between the wheel and way would tend to vary, if the shaft 40 were rigidly held in vertical position at a fixed distance from the tank center as determined by the horizontal truss 52. It is obviously desirable to maintain a constant contact and pressure; and this is achieved by the pivotal support of the swinging frame 37 with motor and drive wheel mounted thereon, as described.

The drive wheel 41 travels below the liquid level 16, as mentioned before. It will be appreciated that a constant and uniform drive effort is desirable. This depends on uniformity of drive pressure, established as stated above, and uniformity of the coefficient of rolling friction between the drive wheel and drive surface. It is well known that the coefficients of friction are subject to great changes depending on the deposition of any humidity, ice or the like on the surfaces involved, as illustrated by the starting characteristics of automobiles on concrete roads when either dry, wet, or icy. I avoid the extreme change from dry to icy condition by keeping the drive surface 43 uniformly wet, submerging it below the liquid level 16. A growth of algae or some other organic or inorganic film may tend to build up on the drive surface, but this is readily broken by the pressure of the drive wheel and prevented from accumulating due to the fact that the surface is vertical, or at any rate non-horizontal. The submerged driveway is located remote from the tank bottom 12 and liquid inlet 23, so that the deposition of dirt which might adhere to the driveway is kept at a minimum.

The most desirable materials and designs for drive wheel tires 42 depend largely on the required speed of the drive mechanism. So long as this mechanism merely propels a sludge scraper system as described, the peripheral velocity of the scraper system and drive is generally limited to a very few inches per minute, although it may sometimes amount to a few feet per minute. Other solids impellers may travel faster; but seldom, if ever, will an impeller have to travel faster than about one to two feet per second, at the periphery. Such velocities are easily negotiated by ordinary automobile or truck tires, on wet concrete roads, regardless of the condition of the tread, so long as side-slipping is prevented by extraneous means such as the support carriage 31, 33. Thus my drive wheel 41 may generally consist of any commercial, resilient tire and wheel, or of a metal core solidly coated with a resilient substance. The substance should be resilient in order to avoid excessive wear of the stationary drive surface. This surface itself, as mentioned, can well be made of concrete, which is generally the most economical material.

While the drive wheel is submerged in order to maintain a uniform driving effort as explained, the drive motor 38 and gear reducer 39 are safely kept non-submergeable, accessible and above the liquid level, for convenience, simplicity and economy in lubricating and servicing the same. The same consideration applies to the axles 102 in the support carriage 31, 33, the center bearings 21 and 36 and the pivots between the pairs of structural frames or elements 33—37, 37—49, 49—50, and 51—52, all of which are readily accessible.

The general construction of the support wheels 31 may well be the same as that of the drive wheel 41, the interrelation of these wheels being somewhat similar to that between the front and rear wheels of an automobile.

Electric energy is easily conveyed to the motor 38 by insulated wires 60 which may extend through the center pier 20, and which may communicate with similar wires attached to the radial thrust arm 35, through the medium of a commutator 61. A manual or magnetic motor starter switch (not shown) may generally be used in the motor circuit, the motors 38 generally being in the fractional ampere class when supplied with current at 110 volt or more. This motor can be made smaller than similar motors previously used, since it is free from the losses of energy encountered in other drives due to the "whipping" of scraper arms, the collecting of snow or sleet on the drive surface, imperfect alignment of drive elements, friction of drive gears or chains, and the like.

In operation, turbid water enters the tank through the central inlet well 23; it is slowly and radially displaced through the tank, and the suspended matter settles to the bottom 12. The clarified water overflows over the weir 15 and is withdrawn through the launder 47. The motor 38 is electrically energized, either continuously or intermittently, to rotate the gear reducer 39, drive shaft 40, and drive wheel 41; and as the drive wheel 41 is held against the drive surface 43 with uniform drive effort, it propels the scraper system uniformly, against a uniform load, by the medium of the swingable frame 36, the support frame 33, the links 49, and the vertical truss 50. Thus the accumulating sludge is uniformly conveyed into the sump 24, for removal through the pipe 25.

It has been explained above how any changes of the drive load originating in connection with the drive or support surfaces are minimized or compensated according to this invention. The load may also change due to different amounts or characteristics of sludge deposited on the bottom at any one time. In case of any overload so originating, the uniform drive effort maintained between the drive wheel and drive surface, as aforesaid, yields an insufficient traction force, and is at least partly absorbed by slippage of the drive wheel on the drive surface. Serious abrasion is, again, prevented by the pivotal support of the swingable drive frame. It will be seen that none of the expensive overload relief devices heretofore used is required in accordance herewith. At the same time the existence or degree of an overload can be indicated by obvious electrical means, not shown, or can be simply discovered by observing the rotary speed, if any, of the radial thrust arm 35 or other visible, rotating parts.

The bearings and pivots are conveniently lubricated and serviced, being installed above the water level. For this purpose, and for proper maintenance of the electrical commutator 61 and the stilling well 23, a walkway 62 with handrails 63 may be carried by the rotating thrust arm 35.

The drive mechanism 30 with the frame structure supporting and holding it can be installed in pre-existing clarification tanks, with new or pre-existing sludge impellers. Said frame structure, as disclosed herein, comprises: (1) the wheeled support frame 33 with the truss or frame 35 connected to it, adjacent the top of the tank; (2) the second frame 37, supporting the drive motor and the drive wheel, the latter being located below the liquid level in the tank; and (3) the third frame or truss 50 with the scraper arm or truss 19 connected to it. No claim is made for this frame structure as such, or for any one or more of its component parts as such; all of these are well known to the art, and it is well understood that they can be made in many different forms.

Many changes can be applied, as will be obvious to persons skilled in the art on consideration hereof.

I claim:

1. In apparatus for the treatment of liquid with precipitation of solids, a tank having a wall associated therewith, which wall presents a submergible and normally submerged driveway in the tank; liquid inlet and outlet means associated with the tank, whereby a liquid level can be substantially maintained in the tank, above said driveway; a frame structure adapted to be moved along said driveway; means to support said frame structure while allowing it to be moved; solids impeller means in the tank, mounted on said frame structure; a drivewheel mounted on the frame structure and adapted to contact said driveway in a direction normal to said driveway and to the periphery of said drivewheel, with sufficient pressure to provide traction; and motor means mounted on said frame structure to drive said drivewheel and thereby to drive said frame structure and solids impeller means.

2. Apparatus according to claim 1 wherein both said drivewheel and motor means are located adjacent the top of the tank, above one another, and arranged about a common, substantially vertical centerline.

3. Apparatus according to claim 1 wherein said tank is substantially circular, said wall is substantially peripherally located, said liquid outlet means, driveway and drivewheel are located substantially at the top of the tank, and said liquid inlet means is located remotely from said liquid outlet means, whereby said drivewheel is protected from adverse effects of the climate and of the solids precipitated in the tank.

4. Apparatus according to claim 1 wherein said frame structure comprises a wheeled carriage supported by an upper part of the tank and adapted to rise and fall relatively to said solids impeller, while moving with the same, whereby adverse effects of substances like snow or ice, on the upper part of the tank, are eliminated.

5. Apparatus according to claim 1 wherein said tank is substantially circular, said wall is substantially peripherally located, and said frame structure is pivoted in the approximate center of the driveway, said drivewheel being mounted on a frame which forms part of and is yieldably mounted on said frame structure to compensate for differences between said approximate center and the true center of said driveway.

AUGUSTUS C. DURDIN, III.

REFERENCES CITED

The following references are of record in the file of this patent:

UNITED STATES PATENTS

| Number | Name | Date |
|---|---|---|
| 1,734,967 | Gavett | Nov. 12, 1929 |
| 2,078,720 | Sayers | Apr. 27, 1937 |
| 2,098,463 | Morehead | Nov. 9, 1937 |
| 1,603,996 | Stokes | Oct. 19, 1926 |
| 1,741,498 | Bousman | Dec. 31, 1929 |
| 1,951,462 | Wing | Mar. 20, 1934 |
| 2,094,552 | Scott | Sept. 28, 1937 |
| 2,098,467 | Sayers et al. | Nov. 9, 1937 |
| 2,149,313 | Sayers et al. | Mar. 7, 1939 |
| 860,775 | Usher | July 23, 1907 |
| 2,067,105 | Stevens et al. | Jan. 5, 1937 |
| 2,062,988 | Callow | Dec. 1, 1936 |
| 2,295,945 | Finney | Sept. 15, 1942 |
| 2,169,442 | Wuensch | Aug. 15, 1939 |
| 1,787,274 | Johnston | Dec. 30, 1930 |
| 1,356,608 | Dorr | Oct. 26, 1920 |

FOREIGN PATENTS

| Number | Country | Date |
|---|---|---|
| 370,665 | Great Britain | Apr. 14, 1932 |
| 765,906 | France | Mar. 31, 1934 |